(No Model.) 2 Sheets—Sheet 1.

S. GRIM.
VEHICLE COUPLING.

No. 564,484. Patented July 21, 1896.

Witnesses
F. L. Ourand
John Enders Jr.

Inventor
Simon Grim,
per E. W. Bradford
Attorney

THE NORRIS PETERS CO., PHOTO-LITHO., WASHINGTON, D. C.

(No Model.) 2 Sheets—Sheet 2.
S. GRIM.
VEHICLE COUPLING.
No. 564,484. Patented July 21, 1896.
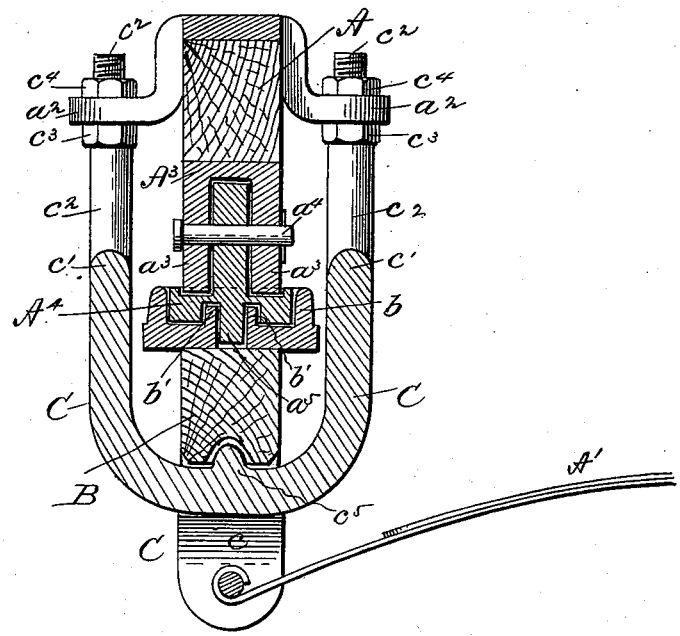
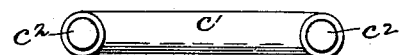
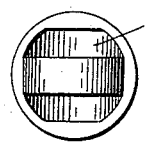
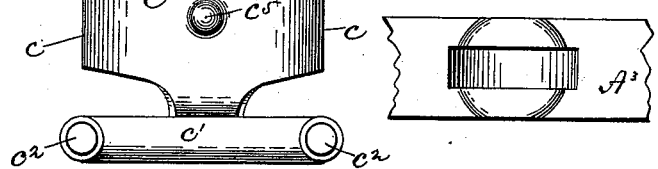
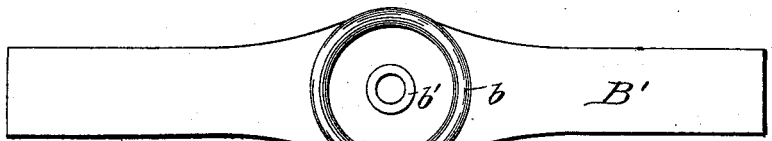

UNITED STATES PATENT OFFICE.

SIMON GRIM, OF ST. PHILLIPS, INDIANA.

VEHICLE-COUPLING.

SPECIFICATION forming part of Letters Patent No. 564,484, dated July 21, 1896.

Application filed September 27, 1895. Serial No. 563,895. (No model.)

*To all whom it may concern:*

Be it known that I, SIMON GRIM, a citizen of the United States, residing at St. Phillips, in the county of Posey and State of Indiana, have invented certain new and useful Improvements in Vehicle-Couplings; and I do hereby declare the following to be a full, clear, and exact description of the invention, such as will enable others skilled in the art to which it appertains to make and use the same.

My said invention consists in certain improvements in the details of construction of couplings for the running-gear of vehicles, whereby the front axle is coupled to said running-gear in such a manner as to permit of its free and independent motion in any direction, as will be hereinafter more fully described and claimed.

Figure 1:
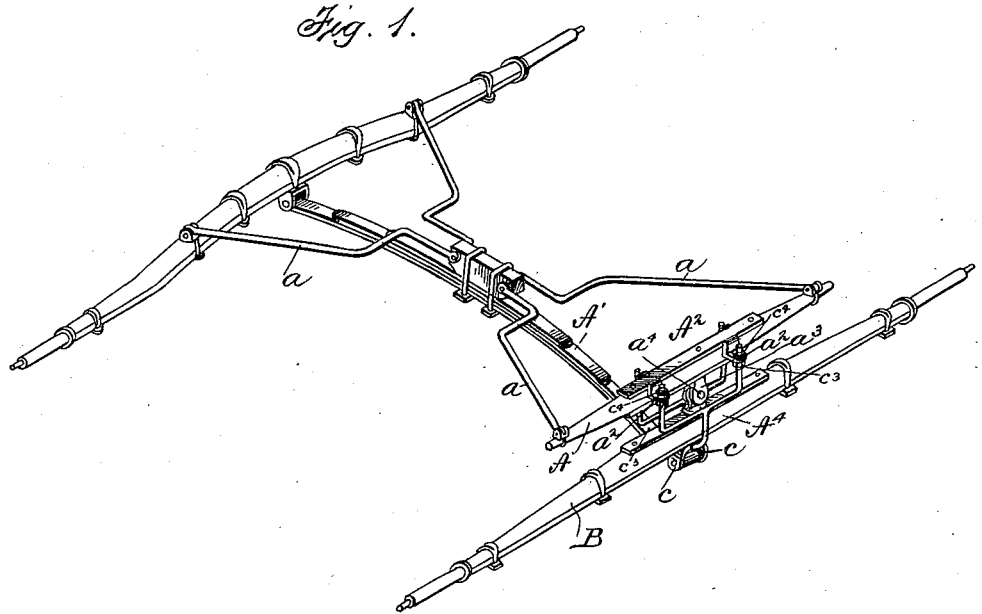
Figure 2:
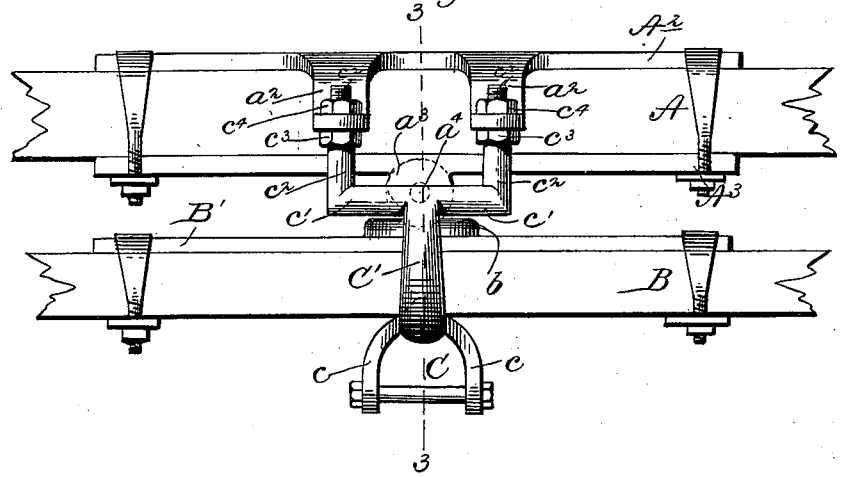

Referring to the accompanying drawings, which are made a part hereof, and on which similar letters of reference indicate similar parts, Figure 1 is a perspective view of the running-gear of a vehicle, showing the front axle coupled thereto with my improved coupling; Fig. 2, a front elevation of the central portion of the same, embodying the coupling device; Fig. 3, a central vertical section on the dotted line 3 3 in Fig. 2; Fig. 4, a top or plan view of the lower part of the coupling device; Fig. 5, a top view of the plate which rests on top of the axle; Fig. 6, a top or plan view of the coupling-pin, and Fig. 7 an underside view of the plate on the under side of the cross-bar.

In said drawings the portion marked A represents the front cross-bar of the running-gear, B the front axle, and C the yoke of the coupling, or its lower part.

As shown in Fig. 1, the character of running-gear for which this coupling is especially designed is that known as the "single-center spring." The two axles are connected by a longitudinal spring A', running from the center of one to the center of the other, and hounds $a$ connect the rear axle and the front cross-bar A with the center of the spring, and are adapted to support the vehicle-body in the well-known manner. The cross-bar A is not in itself of a peculiar construction, being any suitable cross-bar for the purpose. On its top and extending a short distance each side of its center is secured a metal bar or plate $A^2$, having outwardly-projecting ears $a^2$ on its edges near each end, which are preferably bent down to closely embrace the sides of cross-bar, and provided with perforations to receive the ends of the other part of the coupling. Said plate thus constitutes the main portion of the upper half of the coupling device. On the under side of said cross-bar is secured a plate $A^3$, having a half-hinge $a^3$ formed in its center. To said portion is hinged, on the pintle $a^4$, the part $A^4$, carrying the king-bolt or, what it might be termed, the upper half of the fifth-wheel. Said part $A^4$ consists of a circular disk with a half-hinge formed on its top face, which is adapted to connect with the half-hinge $a^3$, as before described, and preferably has a central lug or pin $a^5$ projecting from the center of its under face (constituting the king-bolt proper) to engage with the perforation provided therefor in a part on the axle. The axle B is also, in itself, of an ordinary construction, and has secured on its top, at its center, the plate B'. Said plate B' is formed with an annular ring $b$, within which the disk of the part $A^4$ is adapted to rest. In the center of said annular ring a perforation is formed to receive the pin $a^5$ of said part $A^4$, which constitutes the king-bolt proper. Around said perforation is formed another annular ring $b'$, (see Fig. 3,) which is adapted to retain the lubricant in the annular recess thus formed between the rings $b$ and $b'$, and prevent it from wasting through said central perforation.

The yoke or lower part C of the coupling consists of a base having downwardly-turned ears $c$ on each side, to which the front end of the spring A' is connected, as shown. On each side of the axle single standards C' extend up from said base to a point above the axle, where each is formed with a horizontal part $c'$, extending each way to points beneath the ears $a^2$ of the part $A^2$, where they are turned upward and form uprights $c^2$, which project through the perforations in said ears. The upper ends of said uprights $c^2$ are formed screw-threaded, and nuts $c^3$ are mounted thereon beneath the ears $a^2$, and nuts $c^4$ above said ears. In the center of said plate C is formed a cone $c^5$, which projects upwardly and engages with a correspondingly-formed cavity in the under side of the axle at its center, forming a very loose and free connection between them.

In assembling the parts, the plates $A^2$, $A^3$, and $B'$ being secured as shown, and the part $A^4$ being hinged to the center of the plate $A^3$, said part is placed in the annular recess in the center of the plate $B'$, said parts being formed to fit together. The coupling $C'$ is put in position with the cone $c^5$, in the cavity provided therefor in the axle, the screw-threaded uprights $c^2$, with the nuts $c^3$ thereon, are inserted in the perforations in the ears $a^2$ of the plate $A^2$, and the nut $c^4$ put in position to secure the several parts together. By manipulation of the nuts $c^3$ and $c^4$, as will be readily understood, the base C may be adjusted toward or from the axle B. In actual practice it is desirable to leave a space, as indicated in Fig. 3, for the free play of said axle between the uprights $C'$, and also between the lower face of the axle and the upper face of the plate. The base C is therefore of the width required to sufficiently separate the standards $C'$ to allow free backward and forward motion of the axle, and the nuts are adjusted to separate it from the face of the axle the distance desired. Thus, as the forward wheels pass over rough or uneven surfaces, the axle is permitted free motion up and down or back and forth, without being influenced by the weight upon them, the hinged king-bolt and the cone-bearing preventing any strain or friction in the movements. The horse is thus relieved of the common side draft and motion of the shafts, and the operation of the front axle left free and independent.

Having thus fully described my said invention, what I claim as new, and desire to secure by Letters Patent, is—

1. In a coupling for vehicles, the combination of the cross-bar of the running-gear having the top part of the coupling mounted thereon, a swivel connection which embodies both a vertical and a horizontal pivot between said cross-bar and the front axle, and the lower part of the coupling consisting of a yoke having branches which extend up and engage with said top part, and means for securing them together, substantially as set forth.

2. In a vehicle-coupling, the combination of the front cross-bar, the plate $A^2$ provided with ears $a^2$ mounted on the top thereof, the front axle, the swivel connection which embodies both a vertical and a horizontal pivot between said cross-bar and said front axle, and the yoke C engaging the said front axle and having branches which extend up on each side thereof, and engage with ears $a^2$ of the plate $A^2$, substantially as set forth.

3. In a vehicle-coupling, the combination of the front cross-bar, the top half of the coupling secured thereto, the plate $A^3$ secured to its under side, the king-bolt hinged to the center thereof, the front axle B, the plate $B'$ on the top thereof provided with a recess in its center to engage with said king-bolt and the yoke C provided with branches which extend up on each side of said axle, and engage with the top part of the coupling on the cross-bar, and means for adjustably securing them together, substantially as set forth.

4. In a vehicle-coupling the combination of the cross-bar, the top part of the coupling secured thereon, the front axle, a swivel connection which embodies both a vertical and a horizontal pivot between said axle and cross-bar, and a yoke connected with the center of said front axle by a cone, and formed with branches which extend up and engage with said top part on said cross-bar, substantially as set forth.

In testimony whereof I affix my signature in presence of two witnesses.

SIMON GRIM.

Witnesses:
ANDREW C. RICHARDT,
PAUL DE KRESS.